United States Patent [19]

Kolchinsky

[11] Patent Number: 5,117,869
[45] Date of Patent: Jun. 2, 1992

[54] SOLENOID VALVE
[75] Inventor: Abel E. Kolchinsky, Riverwoods, Ill.
[73] Assignee: Sterling Hydraulics, Inc., Schaumburg, Ill.
[21] Appl. No.: 502,981
[22] Filed: Mar. 30, 1990
[51] Int. Cl.[5] ............... F15B 13/044; F16K 31/06
[52] U.S. Cl. ............... 137/625.65; 251/129.1; 335/256
[58] Field of Search ............ 137/625.65; 251/129.1; 335/256

[56] References Cited

U.S. PATENT DOCUMENTS

| | | | |
|---|---|---|---|
| 4,201,116 | 5/1980 | Martin | 137/625.64 |
| 4,682,135 | 7/1987 | Yamakawa | 335/256 |
| 4,790,345 | 12/1988 | Kolchinsky | 251/129.15 X |

Primary Examiner—Gerald A. Michalsky
Attorney, Agent, or Firm—Wood, Phillips, VanSanten, Hoffman & Ertel

[57] ABSTRACT

A three position solenoid operated spool type cartridge valve includes a pair of solenoids acting on a valve assembly. The valve assembly comprises a valve sleeve having a valve chamber with a plurality of ports and an outlet. A valve spool is slidably mounted in the valve chamber for controlling flow between the ports. The two solenoid coils are removably mounted in concentrically surrounding relationship to a tube assembly. The tube assembly includes a tube end portion with a concave outer end bore. A sleeve is welded to the tube end portion at the outer end. A plunger armature is slidably received in the sleeve between the tube end portion and a tube stop adapter having a concave inner end. The tube stop adapter includes a central axial bore connected to the concave inner end with the bore being enlarged at an outer end. A rod extends through the tube stop adapter bore and includes one end secured to the armature and the other end being secured to the valve spool. A coil spring is contained within the enlarged bore between a shoulder therein and the valve sleeve. The axial distance between the armature and the outer end of the rod is selected so that when the valve is assembled the armature is centrally located relative to the tube end concave end bore and the tube stop adapter concave inner end bore.

7 Claims, 3 Drawing Sheets

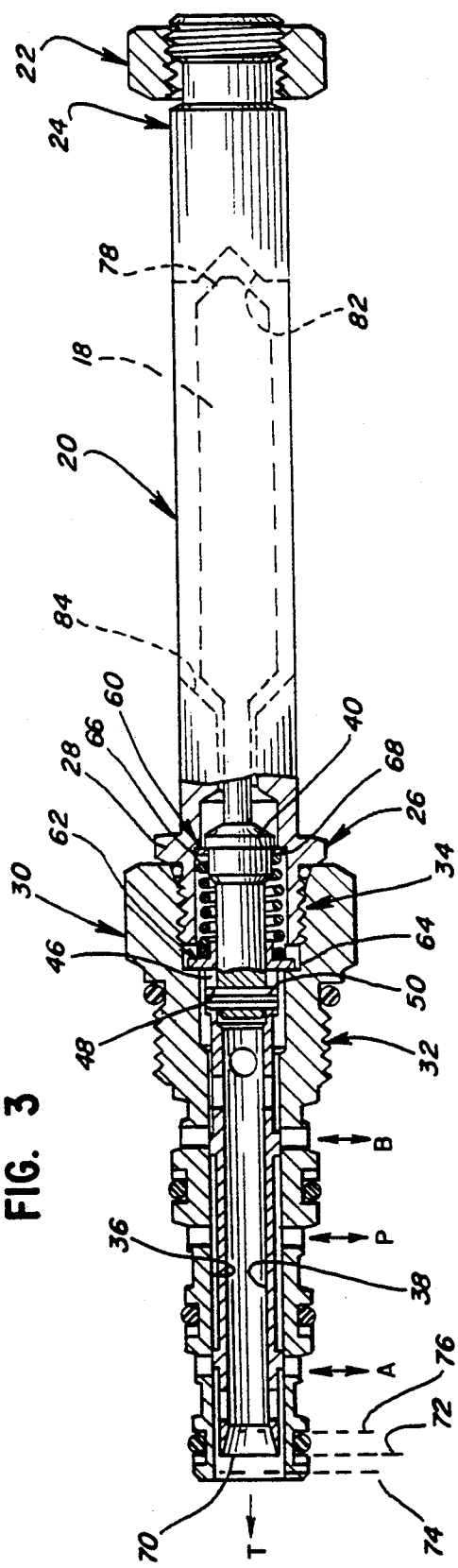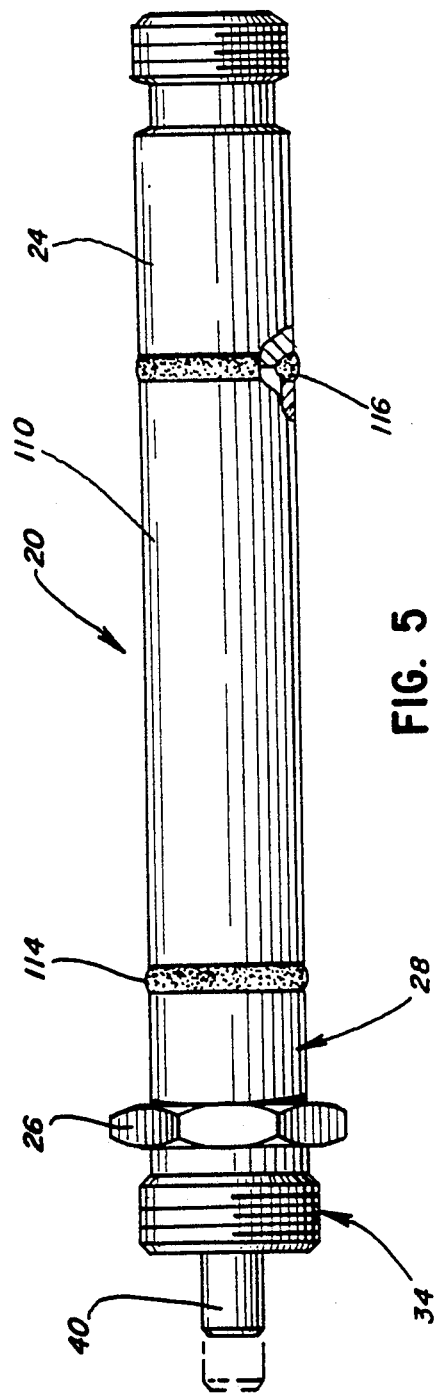

5,117,869

SOLENOID VALVE

FIELD OF THE INVENTION

This invention relates to solenoid valves, and more particularly, to an improved spool type solenoid cartridge valve.

BACKGROUND OF THE INVENTION

A fluid flow control valve in one form comprises a solenoid structure for selectively positioning a valve member. The solenoid structure includes a solenoid coil retained in association with a solenoid tube. An armature is slidably received within the tube for selective positioning as an incident of selective energization of the solenoid coil.

A typical spool type cartridge valve includes a valve body having a valve chamber with a select number of ports. A valve spool is slidably mounted in the valve chamber for controlling flow between ports. The valve spool is slidably connected to the armature.

In a two position spool type valve, the spool and armature are biased in one position, as by a coil spring. The solenoid when energized develops a sufficient magnetic field to cause the armature to overcome the force of the spring and thus move the spool to an actuated position.

With a three position solenoid valve, the valve includes a pair of solenoids. The spool is biased to a neutral position by means of one or more springs. The pair of solenoids act on one or more armatures to selectively push or pull the armature, and thus the spool, to move the spool from the neutral position to one of two opposite actuated positions, thus the name three position solenoid valve.

A typical three position valve in one form includes a single armature within a brazed tube. Specifically, the armature is mounted between a closed inner end and an insert positioned in the outer end of the tube to create two stop positions for the armature. Indeed, the insert and closed ends define the limits for axial movement of the armature and thus define a pair of opposite full and equal substrokes for movement of the armature, and thus also the spool. The coil spring is used to maintain the armature, and thus the spool, in a neutral position with the armature centered between the two stop positions.

It has been found that the use of an insert results in a loss of force which might otherwise be exerted on the spool. Specifically, the flux path developed by the solenoid through the tube must overcome the air gap between the solenoid coil and the insert, resulting in force losses which might otherwise be used for actuation.

Further, a necessity of using the insert causes the tube to be longer than is required for the armature.

The present invention is directed to overcoming one or more of the problems set forth above in a novel and simple manner.

SUMMARY OF THE INVENTION

In accordance with the invention, there is disclosed herein a three position spool type solenoid valve which eliminates the need for an insert to create a second stop position.

Specifically, there is disclosed herein a three position solenoid operated spool type cartridge valve including a pair of solenoids acting on a valve assembly. The valve assembly comprises a valve body having a valve chamber with a plurality of ports and an outlet. A valve spool is slidably mounted in the valve chamber for controlling flow between the ports. The two solenoid coils are removably mounted in concentrically surrounding relationship to a tube assembly. The tube assembly includes a tube end portion with a concave outer end bore. A sleeve is welded to the tube end portion at the outer end. An armature is slidably received in the sleeve between the tube end portion and a tube stop adapter having a concave inner end. The tube stop adapter includes a central axial bore connected to the concave inner end with the bore being enlarged at an outer end. A rod extends through the tube stop adapter bore and includes one end secured to the armature and the other end being secured to the valve spool. A coil spring is contained within the enlarged bore between a shoulder therein and the valve sleeve. The axial distance between the armature and the outer end of the rod is selected so that when the valve is assembled the armature is centrally located relative to the tube end concave end bore and the tube stop adapter concave inner end bore.

In accordance with a further aspect of the invention there is disclosed herein a method of assembling a spool type valve wherein a suitable spacer is used to provide precise axial spacing between the rod outer end and the armature.

Further features and advantages of the invention will readily be apparent from the specification and from the drawing.

BRIEF DESCRIPTION OF THE DRAWING

FIG. 3 is a partial cut-away view of the spool valve of FIG. 1 with the solenoid coils removed;

FIG. 5 is a plan view illustrating the tube stop adapter of FIG. 4A welded to a tube assembly according to the invention.

DESCRIPTION OF THE INVENTION

Figure 1:
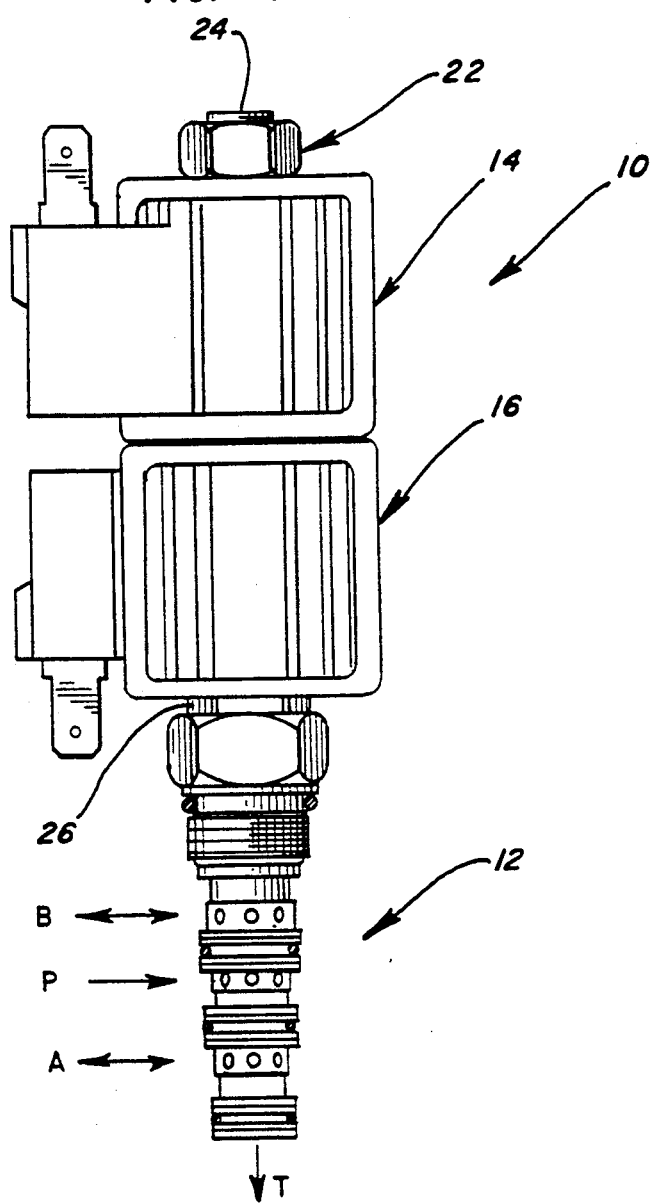
FIG. 1 is a perspective view of a spool valve embodying the invention.

In an illustrated embodiment of the invention, as disclosed in the drawing, a fluid flow control valve generally designated 10 is shown to comprise a four-way, three position spool valve 12 provided with a pair of encapsulated solenoid coils 14 and 16 having opposite magnetic polarities to provide correspondingly opposite forces acting on a solenoid plunger, or armature, 18 received within a solenoid tube assembly 20, see FIG. 3.

The coils 14 and 16 are removably mounted in concentrically surrounding relationship to the tube assembly 20 and are retained in a preselected disposition longitudinally of the tube assembly 20 by means of a nut 22 threadably connected at a tube end portion 24. The nut 22 urges the solenoid coils 14 and 16 against an annular collar 26 of a tube stop adapter 28, see FIG. 3.

Figure 2:
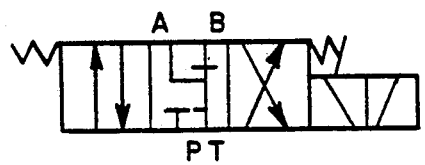
FIG. 2 is a schematic diagram of one possible spool valve configuration.

With specific reference to FIG. 3, a valve assembly 30 includes a valve body 32 threadably secured to the tube stop adapter 28, as at 34. The valve body 32 defines a valve chamber 36 having a pressure port P, first and second control ports A and B and a tank, or outlet port T. A valve spool generally designated 38 is slidably mounted in the valve chamber 36 for selectively controlling flow of fluid between the ports P, A. B and T in accordance with the schematic of FIG. 2. Specifically, the illustrated valve assembly 30 comprises a 4-way on-off reversing spool valve designed to operate double acting cylinders, pilot circuits and by-directional motors, etc. More specifically, the illustrated valve 30 utilizes a floating center spool valve.

The particular configuration of the valve 30 is for illustration only. Other types of spool valves, such as, for example closed center spool valves, or open center spool valves may be used in accordance with the invention.

As used herein the term outer is intended to relate to the outlet end of the valve assembly as represented by the port T, while the term inner relates to the opposite longitudinal end.

The spool 38 is connected to the armature 18 using a rod 40. Specifically, the rod 40 is an elongate rod of generally solid, cylindrical construction. An outer end 42 of the rod 40 includes a radial through opening 44, see FIG. 4A. The outer end 42 is receivable in an inner end 46 of the spool 38 including a corresponding radial through opening 48. The rod outer end 42 is inserted in the spool inner end 48 with the respective openings 44 and 48 aligned and a dowel or rolled pin 50 is then inserted through such openings to maintain the spool 38 and rod 40 in fixed relationship with one another. Specifically, the rod 40 is axially and rotationally movable with the spool 38.

The mid-portion of the pin rod includes an enlarged frusto-conical section 50 defining an annular shoulder 52 on its outer side and ramp shoulder 54 on its inner side. An inner end 56 of the rod 40 is threaded for threadable engagement with a threaded outer axial opening 58 in the armature 18.

With specific reference to FIG. 3, an annular washer 60 is carried on the rod 40 and abuts the axial shoulder 52. A cap washer 62 is positioned in the valve chamber 36 in abutting engagement with a shoulder 64 at its inner end. A coil spring 66, with the tube 20 threadably connected to the valve sleeve 32, as at 34, extends between the annular washer 60 and the cap washer 62. The force of the spring 66 maintains the cap washer 62 abutting the shoulder 64 and forces the annular washer 60 in the inward direction. However, movement is limited by an annular shoulder 68 in the tube stop adapter 28. Thus, the spring 66 maintains the rod 40, and thus the spool 38, in the neutral position, operationally illustrated by the center position in the schematic of FIG. 2.

With reference to FIG. 1, the solenoid 14 is also referred to as a pull solenoid, while the solenoid 16 is referred to as a push solenoid 16. Specifically, energization of the pull solenoid 14 produces a magnetic field which urges the armature 18 inwardly. The coil 14 is selected so that the magnetic force is sufficient to overcome the force of the coil spring 66 acting on the cap washer 62. As a result, the armature 18, and thus rod 40 and spool 38 move inwardly, so that the valve 30 is in the position illustrated by the right most portion of the schematic of FIG. 2.

Conversely, if the push solenoid 16 is energized, then a magnetic field is developed which urges the armature 18 outwardly. Again, the solenoid 16 is selected so that the force is sufficient to overcome the force of the coil spring 66 acting on the annular washer 60. As a result, the armature 18, and thus the rod 40 and spool 38 move outwardly so that operation is as indicated in the left more portion of the schematic of FIG. 2.

With a three position spool valve 12, as illustrated, it is necessary to have full and equal substrokes for both the push and the pull operation. Further, it is desirable to simplify construction of the valve as well as maximizing use of forces produced by the solenoid coils 14 and 16.

With respect to positioning of spool 38, it is necessary that the push and pull strokes be limited. More specifically, and with reference to FIG. 3, the longitudinal position of the outer edge 70 of the spool 38 is illustrated by a line 72. The desired position of the edge 70 following the push stroke is illustrated by a line 74, while the longitudinal position of the edge 70 after the pull stroke is illustrated by a line 76.

Figure 4A:
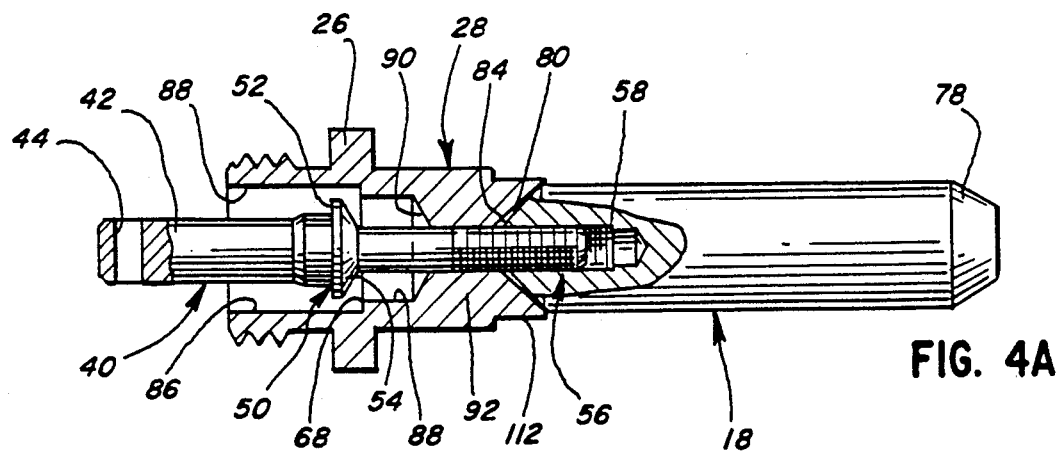
FIGS. 4A-4C illustrate a procedure for precisely securing a rod to an armature.

With reference to FIG. 4A, the armature 18 is of elongate cylindrical construction including opposite inner and outer frusto-conical ends 78 and 80, respectively. To limit stroke in the push movement, the tube assembly 20 includes a concave conical shoulder 82, see FIG. 3. Thus, movement of the armature 18 in the inner direction is limited by the armature inner end 78 abutting the shoulder 82. With respect to the push direction, the tube stop adapter 28 includes an inwardly opening conical concave bore defining a shoulder 84. As a result, axial movement in the outer direction of the armature 18 is limited by the outer end 80 abutting the shoulder 84.

In order to provide equal push and pull substrokes, it is necessary that the armature 18 in the neutral position be centered between the shoulders 82 and 84. Since the axial relationship between the rod 40 and spool 38 is fixed owing to the connection provided by the pin 50, it is necessary that the threadable connection between the rod threaded end 56 and the threaded armature opening 58 be precisely selected in order to effect proper positioning.

With reference to FIG. 4A, a method is illustrated for assembling the rod 40 to the armature 18.

The tube stop adapter 28 includes a central terraced bore 86 extending axially therethrough. The bore 86 includes an enlarged open end 88 connected by the shoulder 68 to a narrower middle section 88. The middle section 88 converges conically inwardly at a shoulder 90 to a relatively narrow bore 92 which opens into the concave conical bore 84. The size of the narrow bore 92 is selected to slidably receive the rod threaded end 56. The diameter of the middle section 88 is selected to be slightly larger than the diameter of the pin annular shoulder 52 so that the frusto-conical portion 50 is slidably received therein.

Figure 4B:
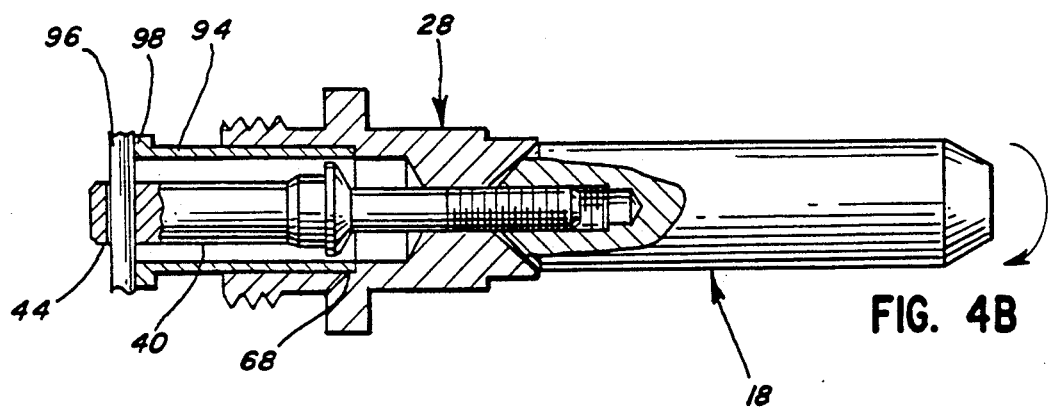

In assembling the rod 40 to the armature 18, the armature 18 is placed with its outer end 80 in abutting engagement with the tube stop adapter shoulder 84. A locking component, such as Permalok HM128, is applied to the rod threaded end 56. This end is then inserted through the bore 86 and threaded partially into the armature threaded bore 58. In order to provide precise axial positioning between the rod 40 and armature 18, a spacer is used to provide precise positioning during the manufacturing process. Specifically, and with reference to FIG. 4B, a cylindrical spacer 94 is inserted in the bore 86 in abutting engagement with the shoulder 68. The length of the spacer 94 is selected to provide a desired precise positioning. Specifically, a dowel pin 96 is inserted through the pin opening 44 with a flange 98 of the spacer 94 thereagainst. The armature 18 is then rotated, as indicated by the arrow, until all the components are tightly assembled. The dowel pin 86 and spacer 94 may then be removed with the selected relative positioning between the rod 40 and the armature 18 being maintained. Once the locking compound hardens, then the rod 40 is effectively unitary with the armature 18 owing to the adhering nature of the compound.

Figure 4C:
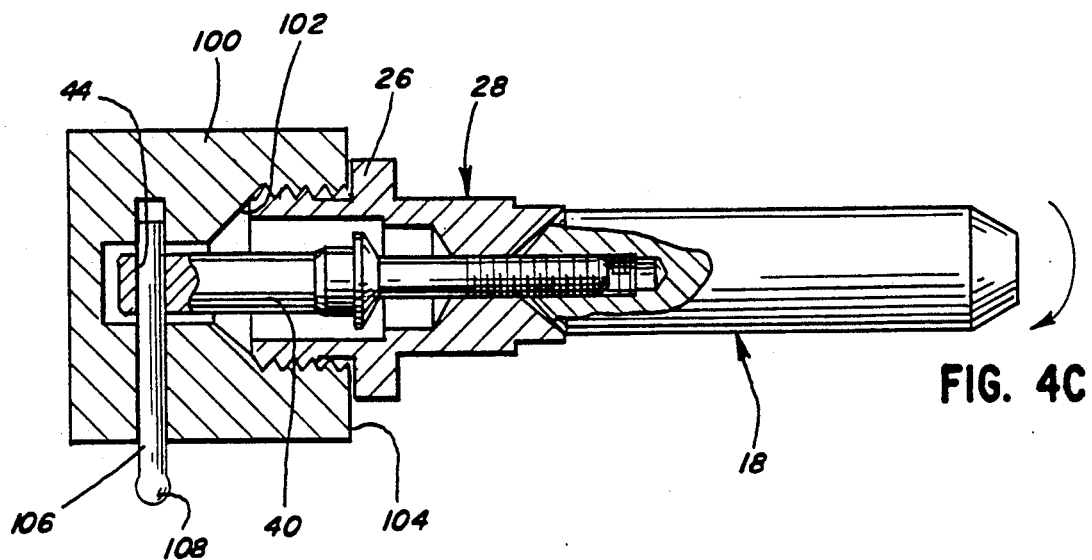

With reference to FIG. 4C, an alternative spacer 100 is illustrated. The spacer 100 is of block construction and includes an enlarged bore 102 for receiving the tube stop adapter 28. Specifically, the spacer 100 includes a surface 104 which abuts the collar 26. The block 100 also includes a side bore 106 in communication with the bore 102. A dowel pin 108 is inserted through the bore 106 and is received in the rod bore 44. Thus, the dowel pin 108 maintains the desired relative positioning of the rod 40 and the armature 18 after it is threadably mounted thereon, as above. Once the proper alignment is made, the pin 108 and spacer 100 can be removed with the locking compound again maintaining a permanent relationship between the two, as discussed above.

With reference to FIG. 5, the method of assembling the tube assembly 20 is illustrated. Specifically, once the rod 40 is secured to the armature 18, as discussed immediately above, an elongated tube 110 is telescopically placed over the armature 18 until it extends over a narrowed inner end 112 of the tube stop adapter 28 see FIG. 4A. Thus positioned, a tig welded joint 114 is provided to maintain the tube 110 in permanent assembled relationship with the tube stop adapter 28. Thereafter, the tube end portion 24, which includes the conical shoulder 82 shown in FIG. 3, is also tig welded to the tube 110, as at 116. Thereafter, the tube assembly 20, specifically the rod 40, can be connected to the spool 38 using the dowel pin 50, and the adapter 28 is threadably inserted in the valve body 32, as illustrated in FIG. 3 at 34.

Although in the illustrated embodiment the armature 18 includes convex ends for abutting concave shoulders in the limiting positions, in practice the ends could be flat or concave, the important factor being that movement be limited to a fixed axial length, as is apparent.

Thus, in accordance with the invention, the threadable connection between the rod 40 and armature 18 can be precisely selected to provide the desired axial relationship. Thus, the valve 12 is provided with full and equal push and pull substrokes as is necessary. Further, by using the threaded connection to permanently assemble the rod 40, the tube stop adapter 28 and the armature 18 allows the insert used in prior three position full valves to be eliminated. This simplifies construction, decreases the overall axial length of the valve 10 and increase the solenoid force acting on the armature 18. Specifically, it is not necessary for the flux to overcome the air gap between the coil and the insert to move the armature 18. Instead, the flux acts more directly on the armature 18.

Thus, in accordance with the invention there is disclosed herein a novel apparatus and method relating to the assembly of a cartridge valve.

The illustrated embodiment of the invention is illustrative of the broad inventive concepts comprehended hereby.

I claim:

1. In a fluid flow control valve having a valve body defining a flow chamber including a plurality of ports and a movable valve member in said chamber movable between a neutral position and first and second actuated positions for controlling fluid flow through said valve chamber between said ports, improved means for positioning said valve member, comprising:

a solenoid tube having a closed inner end;

a solenoid armature movably disposed within said tube;

a tube stop adapter fixedly mounted between said valve body and said solenoid tube for capturing said armature in said tube and limiting movement of said armature between said tube closed inner end and said tube stop adapter, said tube stop adapter and said valve body together defining an inner chamber having opposite ends, said tube stop adapter further including a central bore therethrough opening into said tube and said chamber;

an elongate plunger rod extending through said tube stop adapter bore and having an inner end secured to said armature and an outer end secured to said valve member so that said valve member is movable with said armature;

a single coil spring surrounding said rod within said chamber and disposed between opposite annular elements associated with said rod, said opposite ends of said chamber limiting movement of said annular elements, said spring biasing said annular elements and said rod relative to said valve body and said tube stop adapter so that said valve member is in said neutral position and said armature is disposed intermediate said tube closed inner end and said tube stop adapter; and a pair of solenoid coils surrounding said tube, said coils upon energization overcoming said spring to selectively position said armature abutting either said tube closed inner end or said tube stop adapter to reposition said valve member in said respective first or second actuated position.

2. The improved positioning means of claim 1 wherein said tube stop adapter bore is relatively narrow adjacent said solenoid tube and is enlarged adjacent said valve body, said enlarged bore defining a portion of said chamber.

3. The improved positioning means of claim 1 wherein said rod inner end is threadably secured to said armature.

4. The improved positioning means of claim 1 wherein said rod includes opposite annular shoulders fixedly associated with said rod and said opposite annular elements comprise washers received on said rod between said opposite annular shoulders.

5. The method of positioning a valve member in a fluid flow control valve having a valve body defining a flow chamber including a plurality of ports, the valve member being movable in said chamber between a neutral position and first and second actuated positions for controlling fluid flow through said valve chamber between said ports, comprising the steps of:

providing a solenoid tube having a closed end and an opposite open end;

providing a tube stop adapter, said tube stop adapter further including a central bore therethrough;

inserting an elongate plunger rod through said bore;

fastening an inner end of said rod to a solenoid armature including the step of temporarily inserting a spacer between said tube stop adapter and said rod to provide precise spacing between said adapter and said rod outer end when said rod inner end is fastened to said armature;

inserting said armature through said solenoid tube open end and fastening said tube stop adapter to said solenoid tube to thereby capture said armature in said tube and limit movement of said armature between said tube closed end and said tube stop adapter;

mounting a biasing means about said rod and fastening an outer end of said rod to said valve member; and inserting said valve member in said valve body and fastening said valve body to said tube stop adapter whereby said biasing means biases said rod so that said valve member is in said neutral position and said armature is disposed intermediate said tube closed inner end and said tube stop adapter.

6. The method of claim 5 wherein said rod inner end is threaded to said armature and said fastening step comprises the step of threading said rod to said armature until said armature abuts said tube stop adapter.

7. The method of claim 6 further comprising the step of applying a locking compound to said threaded rod inner end.

* * * * *